US012372994B2

(12) United States Patent
Nagamatsu

(10) Patent No.: US 12,372,994 B2
(45) Date of Patent: Jul. 29, 2025

(54) VEHICULAR PEDAL

(71) Applicant: TOYODA IRON WORKS CO., LTD., Aichi-ken (JP)

(72) Inventor: Takashi Nagamatsu, Toyota (JP)

(73) Assignee: TOYODA IRON WORKS CO., LTD., Aichi-ken (JP)

( * ) Notice: Subject to any disclaimer, the term of this patent is extended or adjusted under 35 U.S.C. 154(b) by 0 days.

(21) Appl. No.: 18/579,366

(22) PCT Filed: Oct. 11, 2022

(86) PCT No.: PCT/JP2022/037811
§ 371 (c)(1),
(2) Date: Jan. 15, 2024

(87) PCT Pub. No.: WO2023/063295
PCT Pub. Date: Apr. 20, 2023

(65) Prior Publication Data
US 2024/0338048 A1 Oct. 10, 2024

(30) Foreign Application Priority Data
Oct. 12, 2021 (JP) ................................ 2021-167413

(51) Int. Cl.
*G05G 1/44* (2008.04)

(52) U.S. Cl.
CPC .................................... *G05G 1/44* (2013.01)

(58) Field of Classification Search
None
See application file for complete search history.

(56) References Cited

U.S. PATENT DOCUMENTS 8,393,245 B2 * 3/2013 Himetani ................. G05G 1/30 74/512
9,003,920 B2 * 4/2015 Nagahori .................. B60T 7/06 74/512
2011/0094329 A1 4/2011 Himetani

FOREIGN PATENT DOCUMENTS

| | | | | |
|---|---|---|---|---|
| CN | 205311578 | U | | 6/2016 |
| CN | 206958227 | U | | 2/2018 |
| CN | 211592522 | U | * | 9/2020 |
| JP | 2008231707 | A | | 10/2008 |
| JP | 2011090525 | A | | 5/2011 |
| JP | 2015011511 | A | | 1/2015 |
| JP | 2015102892 | A | | 6/2015 |

* cited by examiner

*Primary Examiner* — Vicky A Johnson

(57) ABSTRACT

A vehicle pedal includes a hollow arm including two components with a specified length and a pedal seal. The components each include a recess extending in a longitudinal direction of the corresponding component. The two components are joined with each other with the recesses being opposed to each other. The hollow arm includes a wall that forms an opening at a first end of the hollow arm in a longitudinal direction. The wall includes a straight portion and a corner portion. The straight portion is welded to the pedal seat. The corner portion includes a reinforced portion configured to restrict distortion of the corner portion when a pedal force from a user is applied to the pedal seat.

5 Claims, 4 Drawing Sheets

VEHICULAR PEDAL

TECHNICAL FIELD

The present disclosure relates to a vehicle pedal.

BACKGROUND ART

Vehicle pedals include a brake pedal, a clutch pedal, and an accelerator pedal. A vehicle pedal disclosed in Patent Literature 1 includes a hollow arm and a pedal seat. The hollow arm is formed by two components with a specified length and pivotally supported by the vehicle body. Specifically, each flat component includes a recess extending in the longitudinal direction of the component. The hollow arm is formed by joining the two components with each other with the recesses of the two components being opposed to each other. The hollow arm includes an opening at a first end in the longitudinal direction. The hollow arm includes a wall that forms the opening at the first end. The pedal seat is arranged at the first end of the hollow arm and welded to the wall.

CITATION LIST

Patent Literature

Patent Literature 1: Japanese Laid-Open Patent Publication No. 2015-102892

SUMMARY OF INVENTION

Technical Problem

The wall of the hollow arm includes straight portions corresponding to the bottoms of the recesses and corner portions corresponding to the corners of the bottoms of the recesses. Welding the pedal seat to the corner portions of the wall is challenging because of space constraints during welding operations. Thus, the pedal seat is welded to the straight portions of the wall.

However, when a user depresses the vehicle pedal, the pedal force of the user applied to the pedal seat results in the following. Specifically, the load based on the pedal force acts on the pedal seat to twist the pedal seat relative to the hollow arm. As a result of the load applied to the pedal seat, the corner portions, which are not welded to the pedal seat, may be distorted and widened.

Solution to Problem

According to one aspect of the present disclosure, a vehicle pedal is provided. The vehicle panel includes a hollow arm including two components with a specified length and a pedal seat. The components each include a recess extending in a longitudinal direction of the corresponding component. The two components are joined with each other with the recesses being opposed to each other. The hollow arm includes a wall that forms an opening at a first end of the hollow arm in a longitudinal direction. The pedal seat is arranged at the first end and welded to the wall. The wall includes a straight portion and a corner portion. The straight portion is welded to the pedal seat. The corner portion includes a reinforced portion configured to restrict distortion of the corner portion when a pedal force from a user is applied to the pedal seat.

DESCRIPTION OF EMBODIMENTS

A vehicle pedal according to one embodiment will now be described with reference to FIGS. 1 to 7.

Figure 1:
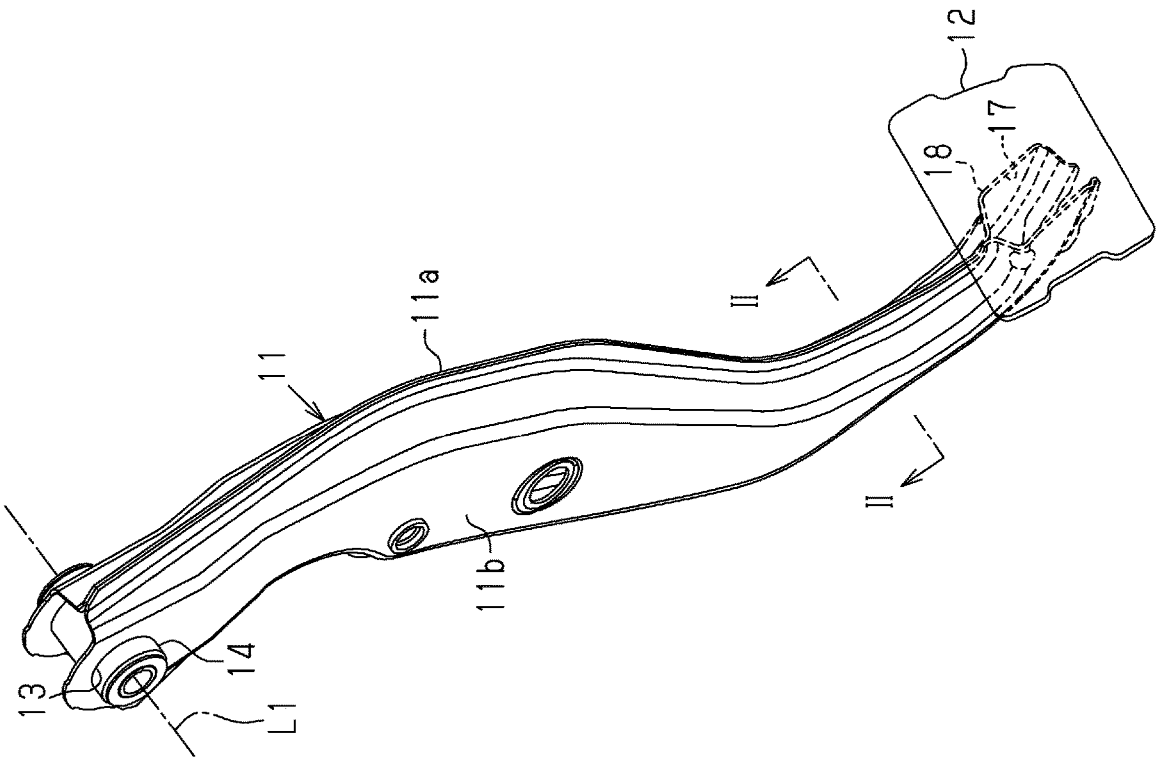
FIG. 1 is a perspective view of a vehicle pedal.

As shown in FIG. 1, the vehicle pedal includes a hollow arm 11 and a pedal seat 12. The hollow arm 11 is formed to have a specified length. A hole 13 is formed in the upper end of the hollow arm 11. The upper end of the hollow arm 11 may be referred to as a second end. A support shaft 14 is inserted through the hole 13. The support shaft 14 is fixed to the body of the vehicle. The hollow arm 11 is pivotally supported by the support shaft 14.

The pedal seat 12 is arranged at the lower end of the hollow arm 11, in other words, an end opposite to the upper end at which the hole 13 is formed. The pedal seat 12 is welded to the lower end. The lower end of the hollow arm 11 may be referred to as a first end. A pedal force, generated when the user depresses the vehicle pedal, is applied to the pedal seat 12. When the pedal force of the user is applied to the pedal seat 12, the vehicle pedal is pivoted about a central axis L1 of the hole 13 and the support shaft 14.

Figure 2:
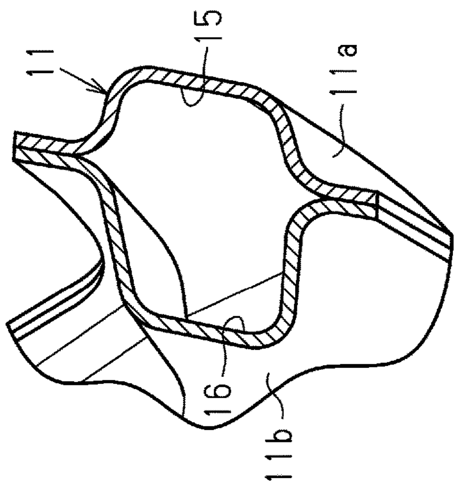
FIG. 2 is a cross-sectional view showing a hollow arm of the vehicle pedal in FIG. 1 taken along line II-II.

FIG. 2 shows the hollow arm 11 in FIG. 1 taken along line II-II. As shown in FIG. 2, the hollow arm 11 is formed by two components, specifically, a first component 11*a* and a second component 11*b*. The first and second components 11*a* and 11*b* are formed by bending elongated plates with a specified length. The first and second components 11*a* and 11*b* respectively include a first recess 15 and a second recess 16 that extend in the longitudinal direction of the first and second components 11*a* and 11*b* (direction intersecting the page of FIG. 2). The hollow arm 11 is formed by joining the first and second components 11*a* and 11*b* with each other with the first and second recesses 15 and 16 of the first and second components 11*a* and 11*b* being opposed to each other.

Figure 3:
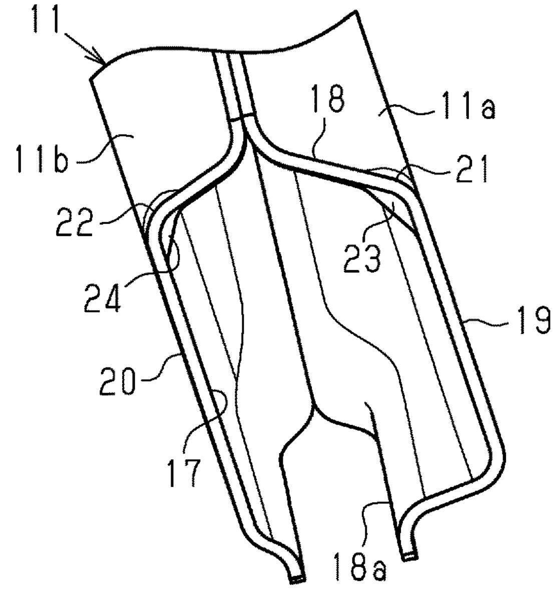
FIG. 3 is a front view showing an opening at the lower end of the hollow arm in FIG. 1.

As shown in FIG. 3, the hollow arm 11 includes an opening 17 at the lower end. The hollow arm 11 includes a wall 18 that forms the opening 17 at the lower end. The wall 18 is an end region of a predetermined area of the hollow arm 11 in the longitudinal direction. The wall 18 may be referred to as an opening forming portion. At the lower end of the wall 18, an open portion 18*a* is formed so that the inside of the hollow arm 11 is open downward. Thus, when the vehicle pedal is immersed in paint and lifted during coating, the paint easily enters the hollow arm 11 and is discharged from the hollow arm 11 through the open portion 18*a*.

The wall 18 includes a first straight portion 19, a second straight portion 20, a first corner portion 21, and a second corner portion 22. The first and second straight portions 19 and 20 are arranged, respectively, at the bottoms of the first and second recesses 15 and 16 of the first and second components 11*a* and 11*b*. The first and second straight portions 19 and 20 are located at the opposite sides of the hollow arm 11. The first and second straight portions 19 and 20 extend linearly when the wall 18 is viewed from the direction facing the opening 17. The first and second straight portions 19 and 20 are opposed and substantially parallel to each other. The first and second straight portions 19 and 20 may be referred to as first and second flat portions. The first and second corner portions 21 and 22 are arranged, respectively, at the corners of the bottoms of the first and second recesses 15 and 16, and connected, respectively, to the first and second straight portions 19 and 20.

Figure 4:
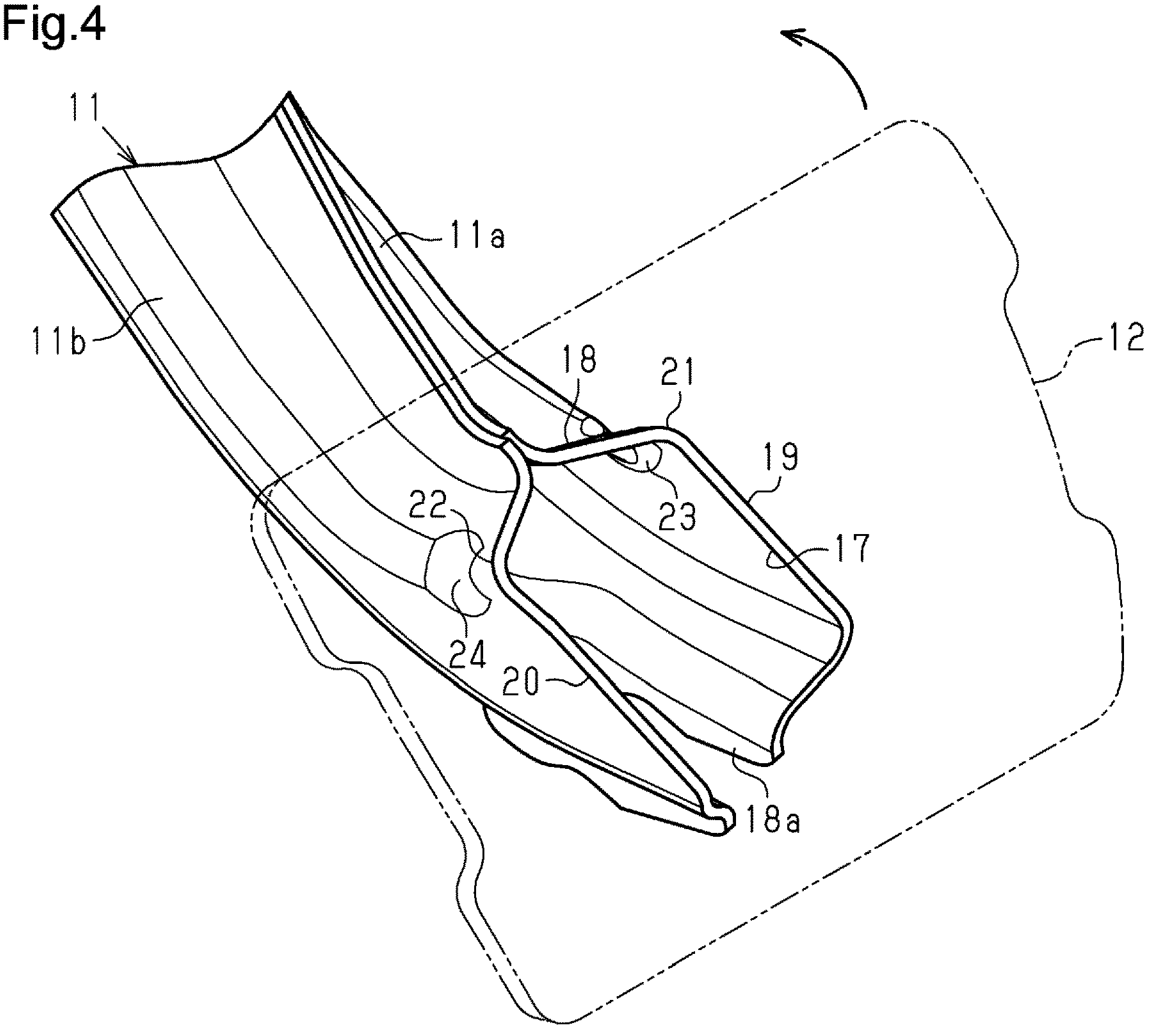
FIG. 4 is a perspective view of the lower end of the vehicle pedal in FIG. 1.

The pedal seat 12 shown in FIG. 4 is welded to the first and second straight portions 19 and 20 of the wall 18. However, the pedal seat 12 is not welded to the first and second corner portions 21 and 22 of the wall 18. This is because it is difficult to secure space required for operations when the pedal seat 12 is welded to the first and second corner portions 21 and 22.

Figure 5:
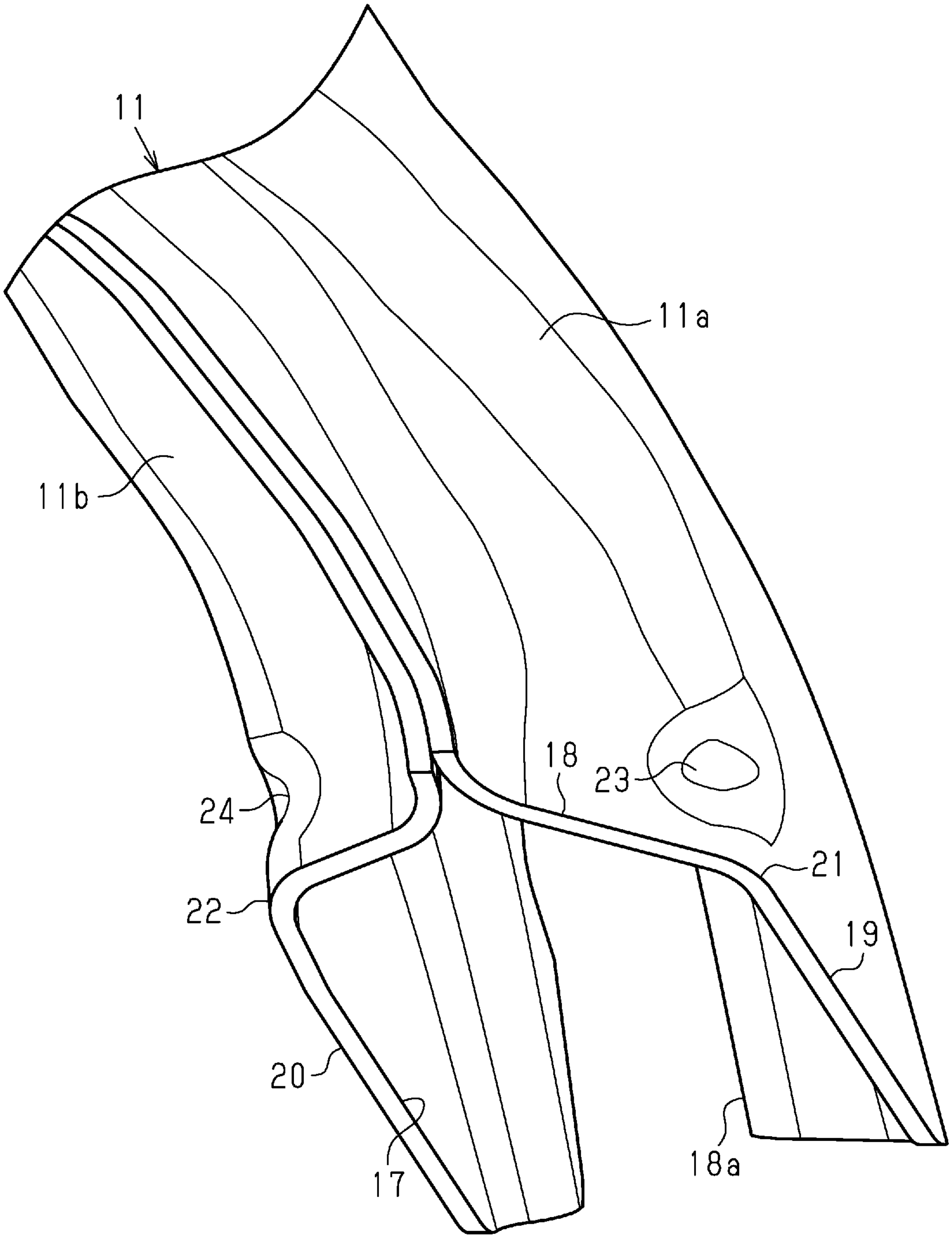
FIG. 5 is a perspective view showing the opening at the lower end of the hollow arm in FIG. 1.

As shown in FIGS. 3 and 5, a first bead 23 and a second bead 24 are arranged, respectively, on the wall 18 to extend across the ridges (vertices) of the first and second corner portions 21 and 22. The first and second beads 23 and 24 are shaped to bulge toward the center of the opening 17 and located near the edges of the wall 18 (end surfaces forming opening 17). The first and second beads 23 and 24 are recessed when viewed from the outside of the hollow arm 11. The first and second beads 23 and 24 are raised when viewed from the inside of the hollow arm 11. The first and second beads 23 and 24 serve as reinforced portions that restrict distortion of the first and second corner portions 21 and 22 when a pedal force from the user is applied to the pedal seat 12.

Figure 7:
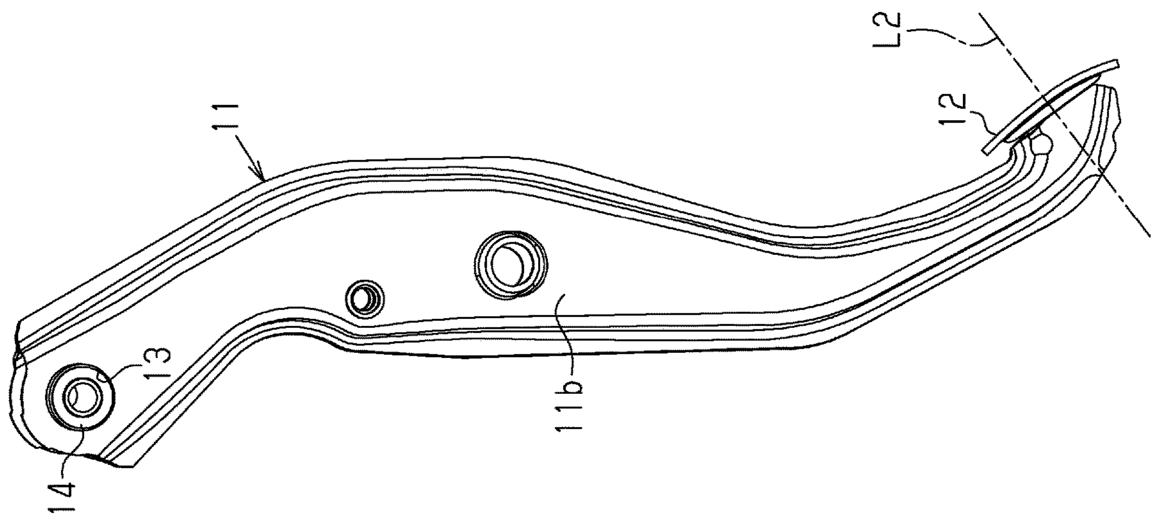
FIG. 7 is a side view of the vehicle pedal in FIG. 1.
Figure 6:
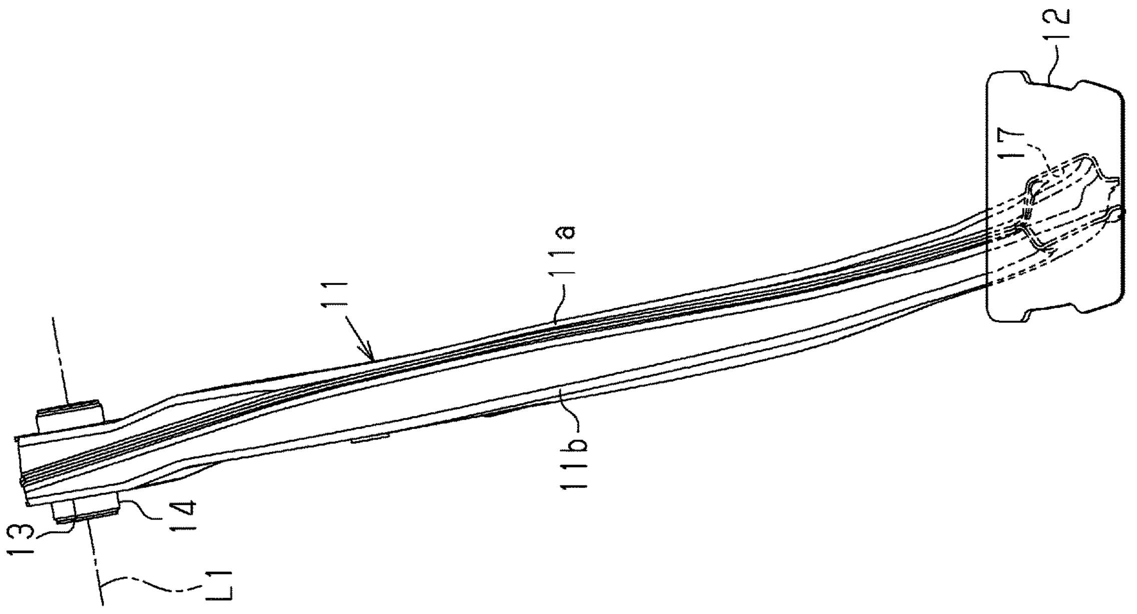
FIG. 6 is a front view of the vehicle pedal in FIG. 1.

FIGS. 6 and 7 show the vehicle pedal in FIG. 1 viewed from the front and the side, respectively. As shown in FIG. 6, the lower end of the hollow arm 11 at which the pedal seat 12 is arranged is offset from the upper end, where the hole 13 is formed, in a direction in which the central axis L1 of the hole 13 extends (rightward in FIG. 6). This is because of limitations on the location where the vehicle pedal is attached to the vehicle body and the location of the vehicle seat on which the user is seated. The offset design allows the user to appropriately operate the vehicle pedal under such limitations.

As shown in FIG. 7, the lower end of the hollow arm 11 is curved so that a central axis L2 of the opening 17 (FIG. 6) is inclined toward the central axis L1 of the hole 13 (FIG. 6). In other words, the lower end of the hollow arm 11 is curved so that the opening 17 is oriented toward a side at which the upper end of the hollow arm 11 is located in relation to the lower end.

The vehicle pedal according to the present embodiment has the advantages described below.

(1) When the user depresses the vehicle pedal, the pedal force of the user is applied to the pedal seat 12. As a result, the load based on the pedal force acts on the pedal seat 12 to twist the pedal seat 12 relative to the hollow arm 11. The direction in which the load acting on the pedal seat 12 in this case is indicated by the arrow in FIG. 4. Such a load acts on the hollow arm 11 in a direction to widen the first and second corner portions 21 and 22 of the wall 18. However, in the present embodiment, the first and second beads 23 and 24, arranged at the first and second corner portions 21 and 22, restrict the distortion of the wall 18 that may result from such a load.

(2) The first and second beads 23 and 24 are arranged, respectively, on the wall 18 to extend across the ridges of the first and second corner portions 21 and 22. The first and second beads 23 and 24, arranged at the first and second corner portions 21 and 22, effectively restrict the distortion and widening of the first and second corner portions 21 and 22 when the load based on the pedal force of the user acts on the pedal seat 12.

(3) The lower end of the hollow arm 11 at which the pedal seat 12 is arranged is offset from the upper end, where the hole 13 is formed, in the direction in which the central axis L1 of the hole 13 extends. Thus, when the load based on the pedal force of the user acts on the pedal seat 12, the pedal seat 12 easily twists relative to the hollow arm 11. As a result, the first and second corner portions 21 and 22 of the wall 18 of the hollow arm 11 may be distorted and widened. However, in the present embodiment, the first bead 23 and the second bead 24 effectively restrict such distortion at the first and second corner portions 21 and 22.

(4) The lower end of the hollow arm 11, at which the pedal seat 12 is arranged, is curved so that the central axis L2 of the opening 17 is inclined toward the central axis L1 of the hole 13. To reduce the movement space of the hollow arm 11, it is preferred that the lower end of the hollow arm 11 at which the pedal seat 12 is arranged be reduced in size and the lower end of the hollow arm 11 be further curved. However, with the hollow arm 11 formed in this manner, when the load based on the pedal force of the user acts on the pedal seat 12, the pedal seat 12 easily twists relative to the hollow arm 11. As a result, the first and second corner portions 21 and 22 of the wall 18 of the hollow arm 11 may be distorted and widened. However, in the present embodiment, the first bead 23 and the second bead 24 effectively restrict such distortion at the first and second corner portions 21 and 22.

The above-described embodiment may be modified as follows. The above-described embodiment and the following modification can be combined if the combined modifications remain technically consistent with each other.

The first and second beads 23 and 24 may be shaped to bulge in a direction extending away from the center of the opening 17.

The first and second beads 23 and 24 do not need to be located near the edges of the wall 18.

The lower end of the hollow arm 11 at which the pedal seat 12 is arranged does not need to be offset from the upper end, where the hole 13 is formed, in the direction in which the central axis L1 of the hole 13 extends.

The invention claimed is:

1. A vehicle pedal, comprising:

a hollow arm including two components with a specified length; and a pedal seat, wherein the components each include a recess extending in a longitudinal direction of the corresponding component, the two components are joined with each other with the recesses being opposed to each other, the hollow arm includes a wall that forms an opening at a first end of the hollow arm in a longitudinal direction, the pedal seat is arranged at the first end and welded to the wall, the wall is an end region of a predetermined area of the hollow arm in the longitudinal direction, the wall includes a straight portion arranged at the bottom of the recess and a corner portion arranged at the corner of the bottom of the recess and connected to the straight portion, the straight portion is welded to the pedal seat, the corner portion includes a reinforced portion configured to restrict distortion of the corner portion when a pedal force from a user is applied to the pedal seat, and the reinforced portion includes a bead arranged on the wall to extend across a ridge of the corner portion.

2. The vehicle pedal according to claim 1, wherein the hollow arm includes a second end at a side opposite to the first end, a hole, into which a support shaft that pivotally supports the hollow arm is inserted, is formed at the second end, and the first end is offset from the second end in a direction in which a central axis of the hole extends.

3. The vehicle pedal according to claim 1, wherein the hollow arm includes a second end at a side opposite to the first end, a hole, into which a support shaft that pivotally supports the hollow arm is inserted, is formed at the second end, and the first end is curved so that a central axis of the opening is inclined toward a central axis of the hole.

4. The vehicle pedal according to claim 1, wherein the hollow arm includes a second end at a side opposite to the first end, a hole, into which a support shaft that pivotally supports the hollow arm is inserted, is formed at the second end, and the first end is curved so that the opening is oriented toward a side at which the second end is located in relation to the first end.

5. The vehicle pedal according to claim 1, wherein the bead is located away from an end surface of the wall that forms the opening.

* * * * *